United States Patent
Yoon et al.

(10) Patent No.: US 10,938,588 B2
(45) Date of Patent: Mar. 2, 2021

(54) CONFERENCE SYSTEM AND METHOD FOR SWITCHING CONNECTION TERMINAL THEREOF

(71) Applicant: SAMSUNG SDS CO., LTD., Seoul (KR)

(72) Inventors: Hee-Tae Yoon, Seoul (KR); Seong-Joong Chang, Seoul (KR); Jun-Ho Kang, Seoul (KR); Do-Hyung Im, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/175,148

(22) Filed: Oct. 30, 2018

(65) Prior Publication Data

US 2019/0132142 A1    May 2, 2019

(30) Foreign Application Priority Data

Oct. 31, 2017 (KR) .......................... 10-2017-0143132

(51) Int. Cl.
*H04L 12/18* (2006.01)
*H04M 3/56* (2006.01)
*H04M 3/42* (2006.01)

(52) U.S. Cl.
CPC ...... *H04L 12/1818* (2013.01); *H04L 12/1822* (2013.01); *H04M 3/563* (2013.01); *H04M 3/42263* (2013.01)

(58) Field of Classification Search
None
See application file for complete search history.

(56) References Cited

U.S. PATENT DOCUMENTS

| | | | | |
|---|---|---|---|---|
| 2004/0199580 | A1* | 10/2004 | Zhakov | H04L 12/1818 709/204 |
| 2009/0097628 | A1* | 4/2009 | Yap | H04M 3/56 379/202.01 |
| 2009/0220066 | A1* | 9/2009 | Shaffer | H04M 3/56 379/204.01 |
| 2010/0272250 | A1* | 10/2010 | Yap | H04M 3/58 379/212.01 |
| 2011/0271209 | A1* | 11/2011 | Jones | H04L 67/36 715/753 |

(Continued)

*Primary Examiner* — Antim G Shah
(74) *Attorney, Agent, or Firm* — Sughrue Mion, PLLC

(57) ABSTRACT

A conference system and a method of switching a connection terminal in the conference system are provided. The conference system according to one embodiment of the present disclosure includes a web conference server configured to receive a request for switching a connection terminal from a first terminal and acquire identification information of a second terminal included in the request for switching a connection terminal; and an audio conference server configured to process a connection of the second terminal to an audio conference and transmit identification information of the second terminal to the web conference server, wherein the web conference server compares the identification information of the second terminal acquired from the first terminal with the identification information of the second terminal received from the audio conference server and updates participant information of the audio conference, which is mapped with participant information of the web conference.

15 Claims, 5 Drawing Sheets

(56) References Cited

U.S. PATENT DOCUMENTS

| | | | |
|---|---|---|---|
| 2012/0278727 A1* | 11/2012 | Ananthakrishnan | H04L 29/08576 715/748 |
| 2012/0281823 A1* | 11/2012 | Colbert | H04M 3/563 379/202.01 |
| 2015/0032809 A1* | 1/2015 | Xie | H04L 65/1083 709/204 |
| 2016/0259425 A1* | 9/2016 | Lovitt | H04M 3/58 |

* cited by examiner

CONFERENCE SYSTEM AND METHOD FOR SWITCHING CONNECTION TERMINAL THEREOF

CROSS-REFERENCE TO RELATED APPLICATION(S)

This application claims the benefit under 35 USC § 119(a) of Korean Patent Application No. 10-2017-0143132, filed on Oct. 31, 2017, in the Korean Intellectual Property Office, the entire disclosure of which is incorporated herein by reference for all purposes.

BACKGROUND

1. Field

The following description relates to a technology for conference connection in a multi-party conference system.

2. Description of Related Art

An audio conference system is a remote communication system in which two or more users access a virtual conference room using phones and simultaneously conduct a conference using voice. By using the audio conference, people at multiple locations can conveniently collaborate using phones.

A general audio conference has provided only voice data transmission/reception between multiple users. However, in recent years, there is a growing demand to provide various additional services, such as document sharing, screen sharing, and sharing of writing, in the audio conference. Accordingly, attempts have been increasingly made to provide additional services to the audio conference by setting up a web conference separate from the audio conference and linking the web conference with the audio conference.

A user who wishes to participate in an audio conference connects to an audio conference server using various types of voice call terminals, such as a personal computer, a mobile device, a wearable device, and the like. In this case, when the user who is taking part in the audio conference using a specific terminal desires to switch a connection terminal of the audio conference to another terminal, cumbersome procedures of terminating a call connected to the existing terminal and re-entering a phone number for connecting to an audio conference server, a personal identification number (PIN) code for identifying the audio conference, and a password (when a password is set for entering a conference) to a new terminal to be switched are required. In addition, as described above, in the case of an audio conference linked to a web conference, a process of updating participant information of the web conference from the existing terminal to the new terminal after the connection of the new terminal is additionally needed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for switching a connection terminal of an audio conference to another terminal with a single action of a user in a conference system in which an audio conference is linked to a web conference and synchronizing participant information between the audio conference and the web conference by reflecting information of the newly connection terminal.

In one general aspect, there is provided a conference system including: a web conference server configured to receive a request for switching a connection terminal from a first terminal and acquire identification information of a second terminal included in the request for switching a connection terminal; and an audio conference server configured to process a connection of the second terminal to an audio conference and transmit identification information of the second terminal to the web conference server, wherein the web conference server compares the identification information of the second terminal acquired from the first terminal with the identification information of the second terminal received from the audio conference server and updates participant information of the audio conference, which is mapped with participant information of the web conference.

The identification information of the second terminal may include one or more of a phone number, network access information, and a personal identification number (PIN) of the second terminal.

The audio conference server may receive a call originated from the second terminal and process the connection of the second terminal to the audio conference.

The web conference server may transmit connection information of the audio conference server to the second terminal and the second terminal may originate the call for connecting to the audio conference using the received connection information of the audio conference server.

The connection information of the audio conference server may include at least one of a connection phone number and network access information of the audio conference server.

The audio conference server may receive identification information of the second terminal from the web conference server, originate a call to the second terminal using the received identification information of the second terminal, and process the connection of the second terminal, which receives the call, to the audio conference.

The web conference server may request the audio conference server to terminate a connection to the first terminal when the update of the participant information is completed, and the audio conference server may terminate the connection with the first terminal according to the request for terminating the connection.

In another general aspect, there is provided a method of switching a connection terminal, including: receiving, at a web conference server, a request for switching a connection terminal from a first terminal; acquiring, at the web conference server, identification information of a second terminal included in the request for switching a connection terminal; processing, at an audio conference server, a connection of the second terminal to an audio conference; receiving, at the web conference server, identification information of the second terminal connected to the audio conference from the audio conference server; and comparing, at the web conference server, the identification information of the second terminal acquired from the first terminal with the identification information of the second terminal received from the audio conference server and updating participant information of the audio conference, which is mapped with participant information of the web conference.

The identification information of the second terminal may include one or more of a phone number, network access information, and a PIN of the second terminal.

The processing of the connection of the second terminal to the audio conference may include receiving a call originated from the second terminal and processing the connection of the second terminal to the audio conference.

The method may further include, prior to receiving the identification information of the second terminal, transmitting connection information of the audio conference server to the second terminal, wherein the second terminal originates the call for connecting to the audio conference using the received connection information of the audio conference server.

The connection information of the audio conference server may include at least one of a connection phone number and network access information of the audio conference server.

The processing of the connection of the second terminal to the audio conference may include receiving identification information of the second terminal from the web conference server, originating a call to the second terminal using the received identification information of the second terminal, and processing the connection of the second terminal to the audio conference.

The method may further include, subsequent to updating: requesting, at the web conference server, the audio conference server to terminate a connection to the first terminal; and terminating, at the audio conference server, the connection with the first terminal according to the request for terminating the connection.

In still another general aspect, there is provided a web conference server device including: one or more processors; a memory; and one or more programs, wherein the one or more programs are stored in the memory and configured to be executed by the one or more processors and the one or more programs include: a command for receiving a request for switching a connection terminal from a first terminal and acquiring identification information of a second terminal included in the request for switching a connection terminal; a command for receiving identification information of the second terminal connected to an audio conference from an audio conference server; and a command for comparing the identification information of the second terminal acquired from the first terminal with the identification information of the second terminal received from the audio conference server and updating participant information of the audio conference, which is mapped with participant information of the web conference.

The identification information of the second terminal may include one or more of a phone number, network access information, and a PIN of the second terminal.

The one or more programs may further include a command for transmitting connection information of the audio conference server to the second terminal, the second terminal may originate a call for connecting to the audio conference using the received connection information of the audio conference server, and the audio conference server may receive the call originated from the second terminal and process a connection of the second terminal to the audio conference.

The connection information of the audio conference server may include at least one of a connection phone number and network access information of the audio conference server.

The one or more programs may further include a command for transmitting the identification information of the second terminal, which is received from the first terminal, to the audio conference server, and the audio conference server may originate a call to the second terminal using the received identification information of the second terminal and process the connection of the second terminal, which receives the call, to the audio conference.

The one or more programs may further include a command for requesting the audio conference server to terminate a connection to the first terminal when the update of the participant information is completed and the audio conference server may terminate the connection with the first terminal according to the request for terminating the connection.

Other features and aspects will be apparent from the following detailed description, the drawings, and the claims.

Figure 1:
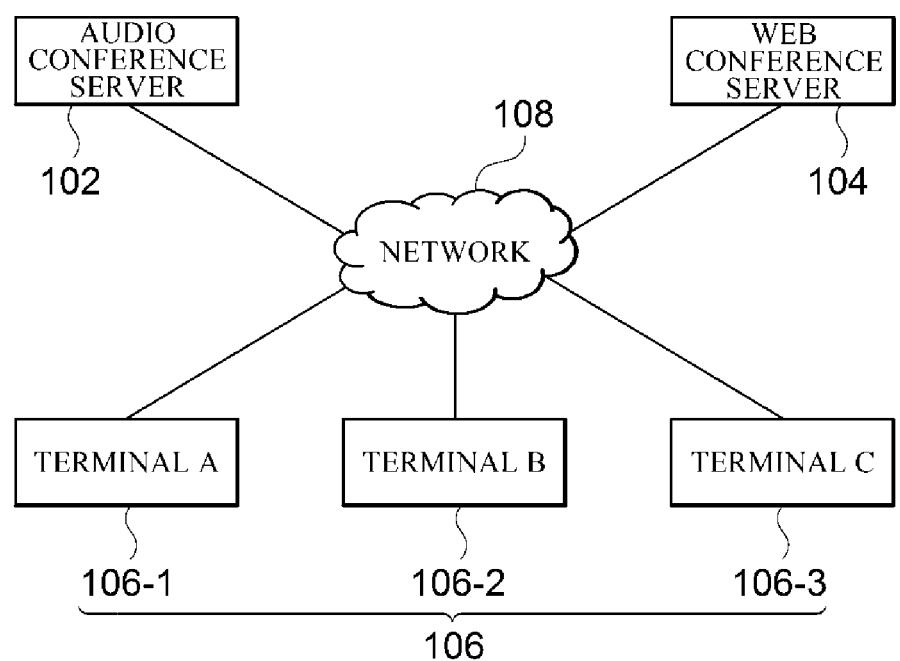
FIG. 1 is a block diagram for describing a conference system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram for describing a conference system 100 according to one embodiment of the present disclosure. As shown in FIG. 1, the conference system 100 according to one embodiment of the present disclosure includes an audio conference server 102, a web conference server 104, and one or more conference participant terminals 106.

The audio conference server 102 is a server for providing an audio conference service between the one or more conference participant terminals 106.

The web conference server 104 is a server for providing a web conference service between the one or more conference participant terminals 106. In the disclosed embodiments, the web conference server 104 may provide services, such as screen sharing, sharing of writing, document sharing, and the like between participants of an audio conference, in cooperation with the audio conference server 102. In one embodiment, the web conference server 104 receives identification information of each conference participant terminal 106 connected to the audio conference from the audio conference server 102 and maps and stores participant information of a web conference and participant information of an audio conference. In this case, the identification information of the conference participant terminal 106 may include all types of information necessary for the audio conference server 102 to identify the conference participant terminal 106, such as an outgoing phone number of the conference participant terminal 106, network identification information (Voice over Internet (VoIP) identification number or the like) of the conference participant terminal 106, a personal identification number (PIN), and the like.

The conference participant terminal 106 is a terminal used by a conference participant who connects to the audio conference server 102 and the web conference server 104 to join the audio conference and the web conference. In the disclosed embodiments, the one or more conference participant terminals 106 may include all types of communication devices capable of being provided with the audio conference service and the web conference service, such as desktop computers, notebook computers, tablet computers, smartphones, and wearable devices. In the illustrated embodiment, three devices including terminal A 106-1, terminal B 106-2, and terminal C 106-3 connect to the audio conference server 102 and the web conference server 104 to take part in the audio conference and the web conference, but embodiments of the present disclosure are not limited to a specific number of terminals.

Meanwhile, the audio conference server 102, the web conference server 104, and the one or more conference participant terminals 106 may transmit and receive data therebetween through a communication network 108. In some embodiments, the communication network 108 may include the Internet, one or more local area networks, wide area networks, cellular networks, mobile networks, other types of networks, and/or combinations thereof.

In the disclosed embodiments, the audio conference server 102, the web conference server 104, and the one or more conference participant terminals 106 may be implemented on a computing device including one or more processors and a computer-readable recording medium connected to the processors. The computer-readable recording medium may be present inside or outside of the processors and may be connected to the processors by various well-known means. The processors present inside the computing device may allow each computing device to operate according to exemplary embodiments described herein. For example, the processors may execute an instruction stored in the computer-readable recording medium, and the instruction stored in the computer-readable recording medium may be configured to allow the computing device to execute operations according to the exemplary embodiments described herein when executed by the processors.

Figure 2:
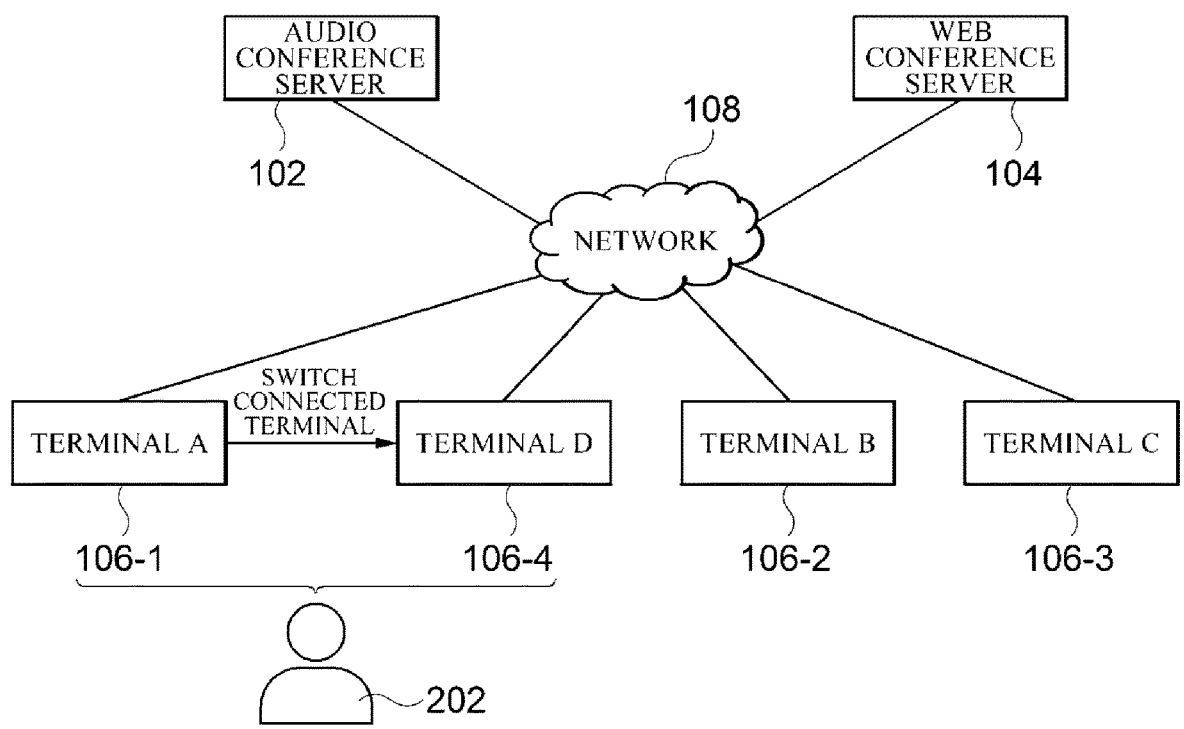
FIG. 2 is a diagram for describing an example in which a connection terminal is switched to another terminal in a conference system according to one embodiment of the present disclosure.

FIG. 2 is a diagram for describing an example in which a connection terminal is switched to another terminal in a conference system 100 according to one embodiment of the present disclosure. As shown in FIG. 2, for example, a conference participant 202 who is taking part in an audio conference using, for example, terminal A 106-1 may switch a currently connected terminal from terminal A 106-1 to terminal D 106-4. For example, the conference participant may change a conference connection terminal to an office telephone for a conference while performing an audio conference using a mobile device.

The conference participant 202 may issue a request for switching a connection terminal to a web conference server 104 linked to an audio conference server 102 in order to switch an audio conference connection terminal from terminal A 106-1 to terminal D 106-4. Accordingly, the web conference server 104 acquires and stores identification information of a target terminal (in the above example, terminal D 106-4) included in the request. Then, the audio conference server 102 processes an audio conference connection of terminal D 106-4 and transmits the identification information of terminal D 106-4 to the web conference server 104. The web conference server 104 which has received the identification information compares identification information of terminal D 106-4 acquired from terminal A 106-1 and the identification information of terminal D 106-4 received from the audio conference server 102 and updates the participant information of the audio conference, which is mapped with the participant information of the web conference, from terminal A 106-1 to terminal D 106-4.

Figure 3:
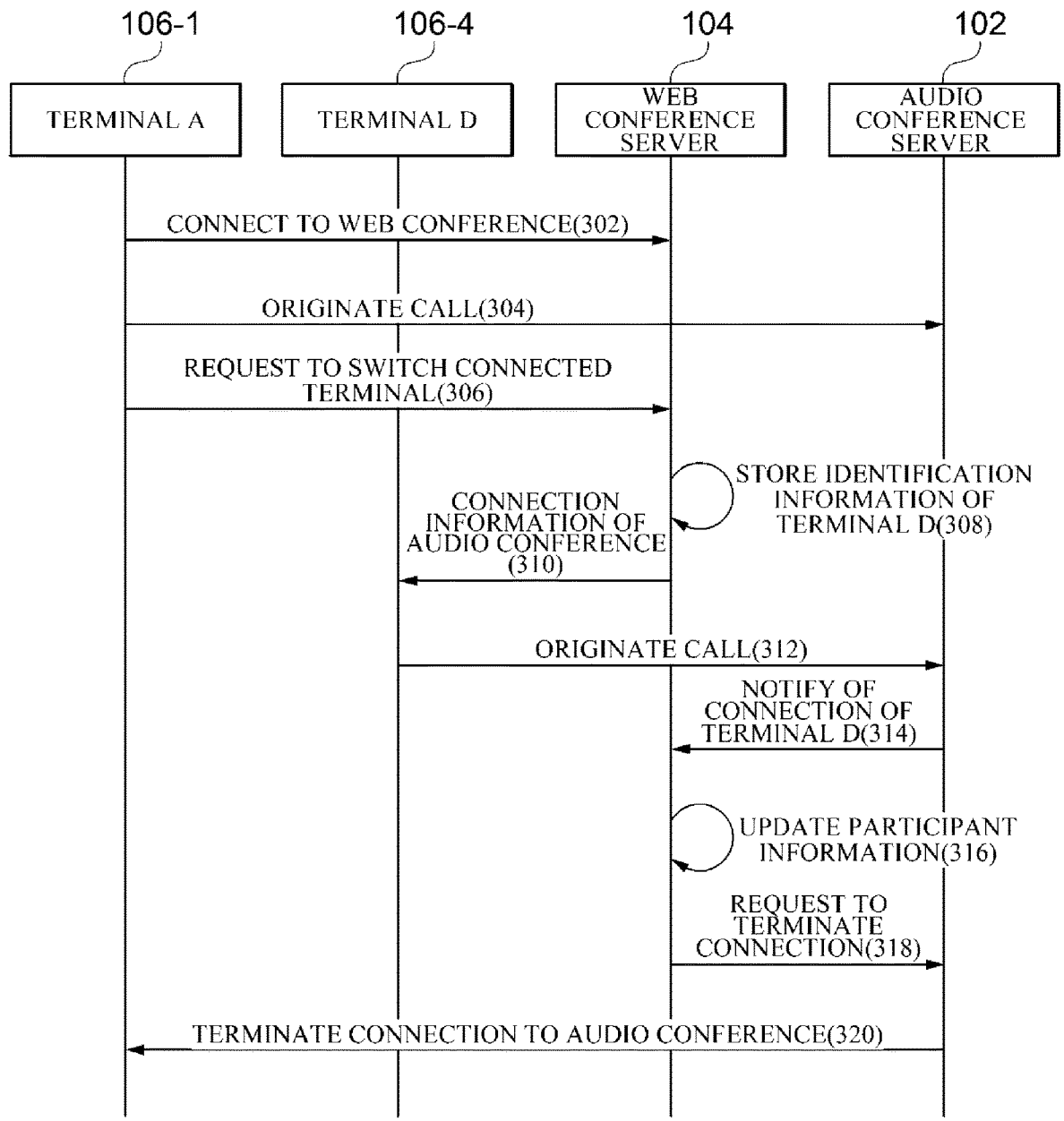
FIG. 3 is a flowchart for describing a method of switching a connection terminal in a conference system according to one embodiment of the present disclosure.

FIG. 3 is a flowchart for describing a method 300 of switching a connection terminal in a conference system according to one embodiment of the present disclosure. The illustrated flowchart assumes that a conference participant connected to the audio conference through terminal A 106-1 switches an audio conference connection terminal to terminal D 106-4. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 302, a web conference server 104 performs a procedure for connection of terminal A 106-1 to a web conference.

In operation 304, an audio conference server 102 performs a procedure for connection of terminal A 106-1 to a web conference. For example, when terminal A 106-1 originates a call to the audio conference server 102 and the audio conference server 102 receives the call, terminal A 106-1 is able to connect to the audio conference server 102 by inputting a PIN code, a connection password, and the like of a conference to be connected. Meanwhile, in this process, the audio conference server 102 may transmit identification information of terminal A 106-1 to the web conference server 104 and the web conference server 104 may map and manage participant information of the audio conference and participant information of the web conference using the received identification information.

In operation 306, the web conference server 104 receives a request for switching a connection terminal from terminal A 106-1. In this case, the request for switching a connection terminal includes identification information of a target terminal, i.e., terminal D 106-4. As described above, the identification information of terminal D 106-4 may include one or more of a phone number, network access information, and PIN of terminal D 106-4.

In operation 308, the web conference server 104 acquires and stores the identification information of terminal D 106-4 included in the request for switching a connection terminal.

In operations 310 and 312, the audio conference server 102 processes a connection of terminal D 106-4 to the audio conference.

Specifically, in operation 310, the web conference server 104 transmits connection information of the audio conference server 102 to terminal D 106-4. The connection information of the audio conference server 102 may include one or more of, for example, a connection phone number and network access information of the audio conference server 102.

In operation 312, terminal D 106-4 may originate a call to the audio conference server 102 using the received connection information, and the audio conference server 102 may receive the call and process the connection of terminal D 106-4 to the audio conference (a call-in method from the perspective of the audio conference server 102).

In operation 314, the audio conference server 102 transmits a notification of connection including the identification information of terminal D 106-4 connected to the audio conference to the web conference server 104.

In operation 316, the web conference server 104 compares the identification information of terminal D 106-4 acquired from terminal A 106-1 in operation 308 with the identification information of terminal D 106-4 received from the audio conference server 102 in operation 314 and updates participant information of the audio conference, which is mapped with participant information of the web conference, from terminal A 106-1 to terminal D 106-4.

In operation 318, the web conference server 104 requests the audio conference server 102 to terminate the connection of terminal A 106-1.

In operation 320, the audio conference server 102 terminates an audio conference connection with terminal A 106-1 according to the request for terminating the connection.

Figure 4:
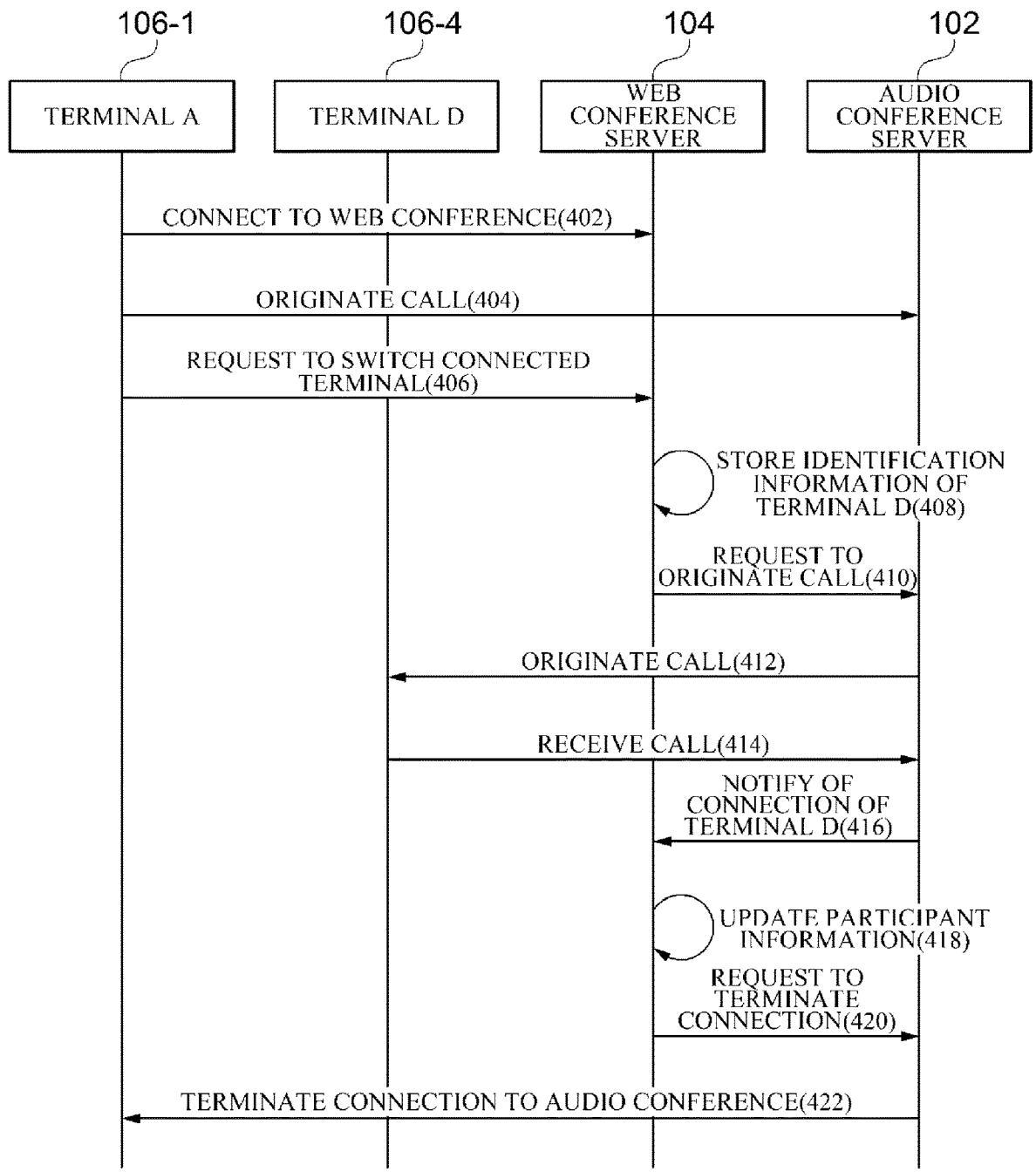
FIG. 4 is a flowchart for describing a method of switching a connection terminal in a conference system according to another embodiment of the present disclosure.

FIG. 4 is a flowchart for describing a method 400 of switching a connection terminal in a conference system according to another embodiment of the present disclosure. The illustrated flowchart assumes that a conference participant connected to an audio conference switches a current audio conference connection terminal to terminal D 106-4. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 402, the web conference server 104 performs a procedure for connection of terminal A 106-1 to a web conference.

In operation 404, the audio conference server 102 performs a procedure for connection of terminal A 106-1 to a web conference. For example, when terminal A 106-1 originates a call and the audio conference server 102 receives the call, terminal A is able to connect to the audio conference server 102 by inputting a PIN code, a connection password, and the like of a conference to be connected. Meanwhile, in this process, the audio conference server 102 may transmit identification information of terminal A 106-1 to the web conference server 104 and the web conference server 104 may map and manage participant information of the audio conference and participant information of the web conference using the received identification information.

In operation 406, the web conference server 104 receives a request for switching a connection terminal from terminal A 106-1. In this case, the request for switching a connection terminal may include identification information of a target terminal, i.e., terminal D 106-4. As described above, the identification information of terminal D 106-4 may include one or more of a phone number, network access information, and PIN of terminal D 106-4.

In operation 408, the web conference server 104 acquires and stores the identification information of terminal D 106-4 included in the request for switching a connection terminal.

In operations 410 to 414, the audio conference server 102 processes a connection of terminal D 106-4 to the audio conference.

Specifically, in operation 410, the web conference server 104 requests the audio conference server 102 to make a phone call for connecting terminal D 106-4 to the audio conference. In this case, the request for making a phone call includes the identification information of terminal D 106-4.

In operation 412, the audio conference server 102 originates a call to terminal D 106-4 using the identification information of terminal D 106-4 received from the web conference server 104.

In operation 414, the audio conference server 102 processes the connection of terminal D 106-4, which has received the call, to the audio conference (a call-out method from the perspective of the audio conference server 102).

In operation 416, the audio conference server 102 transmits a notification of connection including the identification information of terminal D 106-4 connected to the audio conference to the web conference server 104.

In operation 418, the web conference server 104 compares the identification information of terminal D 106-4 acquired from terminal A 106-1 in operation 408 with the identification information of terminal D 106-4 received from the audio conference server 102 in operation 416 and updates the participant information of the audio conference, which is mapped with the participant information of the web conference, from terminal A 106-1 to terminal D 106-4.

In operation 420, the web conference server 104 requests the audio conference server 102 to terminate the connection with terminal A 106-1.

In operation 422, the audio conference server 102 terminates the connection with terminal A 106-1 according to the request for terminating the connection.

Figure 5:
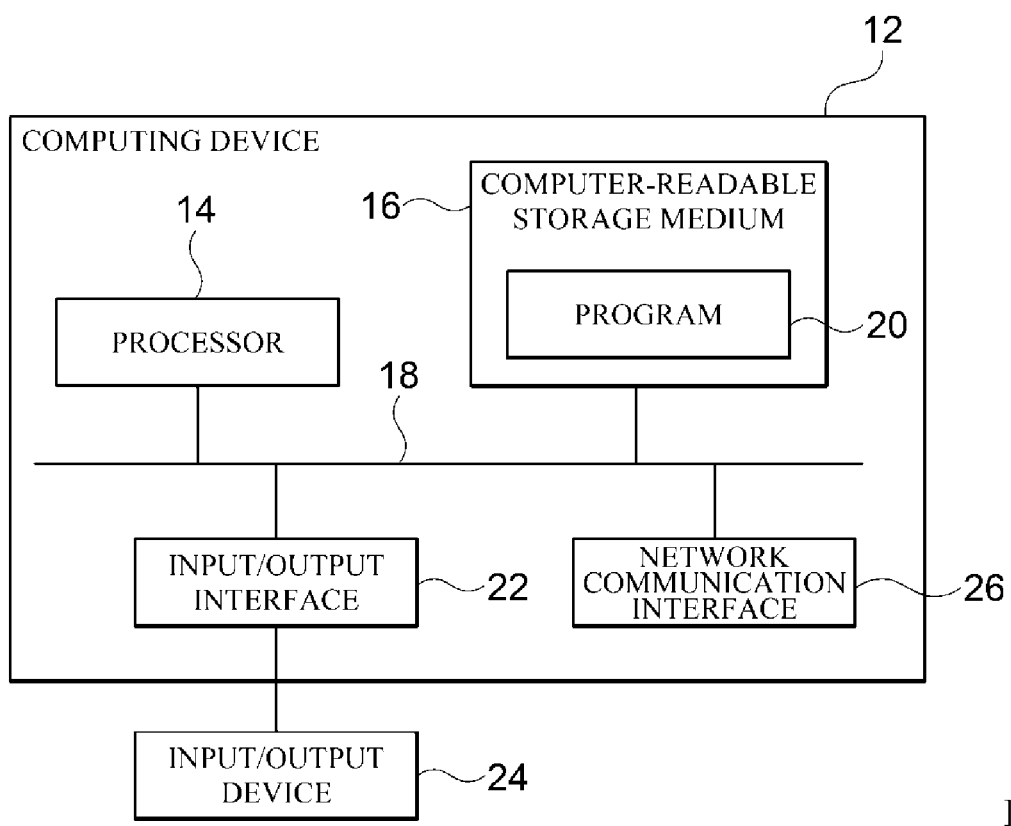
FIG. 5 is a block diagram for describing an example of a computing environment including a computing device suitable to be used in exemplary embodiments.

FIG. 5 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an audio conference server 102. In addition, the computing device 12 may be a web conference server 104 or one or more conference participant terminals 106. The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, in a conference system in which an audio conference is linked to a web conference, a user who wishes to switch a connection terminal of the audio conference to another terminal is allowed to conveniently change the connection terminal with a single action of the user, without inputting additional terminal information or conference information. In addition, in the process of switching the connection terminal, participant information of web conference participants is also updated by including information of the changed terminal, thereby improving convenience and usability of conference users.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A conference system comprising:
a web conference server configured to receive a request for switching a connection terminal from a first terminal connected to a web conference and an audio conference, and acquire identification information of a second terminal included in the request for switching the connection terminal; and
an audio conference server configured to process a connection of the second terminal to the audio conference and transmit the identification information of the second terminal to the web conference server,
wherein the web conference server compares the identification information of the second terminal acquired from the first terminal with the identification information of the second terminal received from the audio conference server and updates participant information of the audio conference, which is mapped with participant information of the web conference, from the first terminal to the second terminal,
wherein the web conference server requests the audio conference server to terminate a connection to the first terminal when the update of the participant information is completed and the audio conference server terminates the connection with the first terminal according to the request for terminating the connection, and
wherein the web conference server transmits connection information of the audio conference server to the second terminal and the second terminal originates a call for connecting to the audio conference using the received connection information of the audio conference server.

2. The conference system of claim 1, wherein the identification information of the second terminal includes one or more of a phone number, network access information, and a personal identification number (PIN) of the second terminal.

3. The conference system of claim 1, wherein the audio conference server receives the call originated from the second terminal and processes the connection of the second terminal to the audio conference.

4. The conference system of claim 1, wherein the connection information of the audio conference server includes at least one of a connection phone number and network access information of the audio conference server.

5. The conference system of claim 1, wherein the audio conference server receives the identification information of the second terminal from the web conference server, originates a call to the second terminal using the received identification information of the second terminal, and processes the connection of the second terminal, which receives the call, to the audio conference.

6. A method of switching a connection terminal, comprising:
- receiving, at a web conference server, a request for switching the connection terminal from a first terminal connected to a web conference and an audio conference;
- acquiring, at the web conference server, identification information of a second terminal included in the request for switching the connection terminal;
- processing, at an audio conference server, a connection of the second terminal to the audio conference;
- transmitting connection information of the audio conference server to the second terminal, wherein the second terminal originates a call for connecting to the audio conference using the received connection information of the audio conference server;
- receiving, at the web conference server, the identification information of the second terminal connected to the audio conference from the audio conference server;
- comparing, at the web conference server, the identification information of the second terminal acquired from the first terminal with the identification information of the second terminal received from the audio conference server and updating participant information of the audio conference, which is mapped with participant information of the web conference, from the first terminal to the second terminal;
- requesting, at the web conference server, the audio conference server to terminate a connection to the first terminal; and
- terminating, at the audio conference server, the connection with the first terminal according to the request for terminating the connection.

7. The method of claim 6, wherein the identification information of the second terminal includes one or more of a phone number, network access information, and a personal identification number (PIN) of the second terminal.

8. The method of claim 6, wherein the processing of the connection of the second terminal to the audio conference comprises receiving the call originated from the second terminal and processing the connection of the second terminal to the audio conference.

9. The method of claim 8, wherein the connection information of the audio conference server includes at least one of a connection phone number and network access information of the audio conference server.

10. The method of claim 6, wherein the processing of the connection of the second terminal to the audio conference comprises:
- receiving the identification information of the second terminal from the web conference server;
- originating a call to the second terminal using the received identification information of the second terminal; and
- processing the connection of the second terminal to the audio conference.

11. A web conference server device comprising:
one or more processors;
a memory; and
one or more programs, wherein
the one or more programs are stored in the memory and configured to be executed by the one or more processors and
the one or more programs include:
- a command for receiving a request for switching a connection terminal from a first terminal connected to a web conference and an audio conference, and acquiring identification information of a second terminal included in the request for switching the connection terminal;
- a command for receiving the identification information of the second terminal connected to the audio conference from an audio conference server;
- a command for comparing the identification information of the second terminal acquired from the first terminal with the identification information of the second terminal received from the audio conference server and updating participant information of the audio conference, which is mapped with participant information of the web conference, from the first terminal to the second terminal;
- a command for requesting the audio conference server to terminate a connection to the first terminal when the update of the participant information is completed and the audio conference server terminates the connection with the first terminal according to the request for terminating the connection,
the one or more programs further include a command for transmitting connection information of the audio conference server to the second terminal,
the second terminal originates a call for connecting to the audio conference using the received connection information of the audio conference server.

12. The web conference server device of claim 11, wherein the identification information of the second terminal includes one or more of a phone number, network access information, and a personal identification number (PIN) of the second terminal.

13. The web conference server device of claim 11, wherein
the audio conference server receives the call originated from the second terminal and processes a connection of the second terminal to the audio conference.

14. The web conference server device of claim 13, wherein the connection information of the audio conference server includes at least one of a connection phone number and network access information of the audio conference server.

15. The web conference server device of claim 11, wherein the one or more programs further include a command for transmitting the identification information of the second terminal, which is received from the first terminal, to the audio conference server and the audio conference server originates a call to the second terminal using the received identification information of the second terminal and processes the connection of the second terminal, which receives the call, to the audio conference.

* * * * *